US007011016B1

(12) United States Patent
Carriker

(10) Patent No.: US 7,011,016 B1
(45) Date of Patent: Mar. 14, 2006

(54) NUT CRACKER

(76) Inventor: Roy I. Carriker, 101 N. Palouse, Kennewick, WA (US) 99336

( * ) Notice: Subject to any disclaimer, the term of this patent is extended or adjusted under 35 U.S.C. 154(b) by 0 days.

(21) Appl. No.: 11/074,511

(22) Filed: Mar. 7, 2005

(51) Int. Cl.
*A23N 5/00* (2006.01)
*A47J 43/00* (2006.01)

(52) U.S. Cl. .......................................... 99/573; 99/581
(58) Field of Classification Search ................ 99/573, 99/572, 582, 581
See application file for complete search history.

(56) References Cited

U.S. PATENT DOCUMENTS

| | | | | |
|---|---|---|---|---|
| 1,322,393 A | * | 11/1919 | Bagby | 99/573 |
| 2,200,515 A | * | 5/1940 | Moeller | 99/573 |
| 2,294,358 A | * | 9/1942 | Aber | 99/579 |
| 2,571,214 A | * | 10/1951 | Dale | 99/582 |
| 4,378,731 A | | 4/1983 | Ruangburapa | |
| 5,115,733 A | | 5/1992 | Frederiksen et al. | |
| 5,315,755 A | | 5/1994 | Fulbright et al. | |
| 6,247,396 B1 | | 6/2001 | Rhett | |
| 6,397,737 B1 | | 6/2002 | Eisel | |
| 6,516,714 B1 | | 2/2003 | Warmaack et al. | |
| 6,541,057 B1 | | 4/2003 | McSwain | |

* cited by examiner

*Primary Examiner*—Reginald L. Alexander
(74) *Attorney, Agent, or Firm*—Floyd E. Ivey; Liebler,Ivey,Connor, Berry & St. Hilaire

(57) ABSTRACT

The Nut Cracker Apparatus (1) receives a nut at the top surface of an anvil. A plunger, aligned with the anvil, is moved vertically, by rack and pinion gear operation of a handle lever means, into contact with the nut thereby exerting cracking or crushing pressure on the shell or hull. The anvil is generally centrally positioned on a chamber floor which is downwardly sloping toward a tray which receives nut meat discharged from the anvil and floor into the tray.

4 Claims, 6 Drawing Sheets

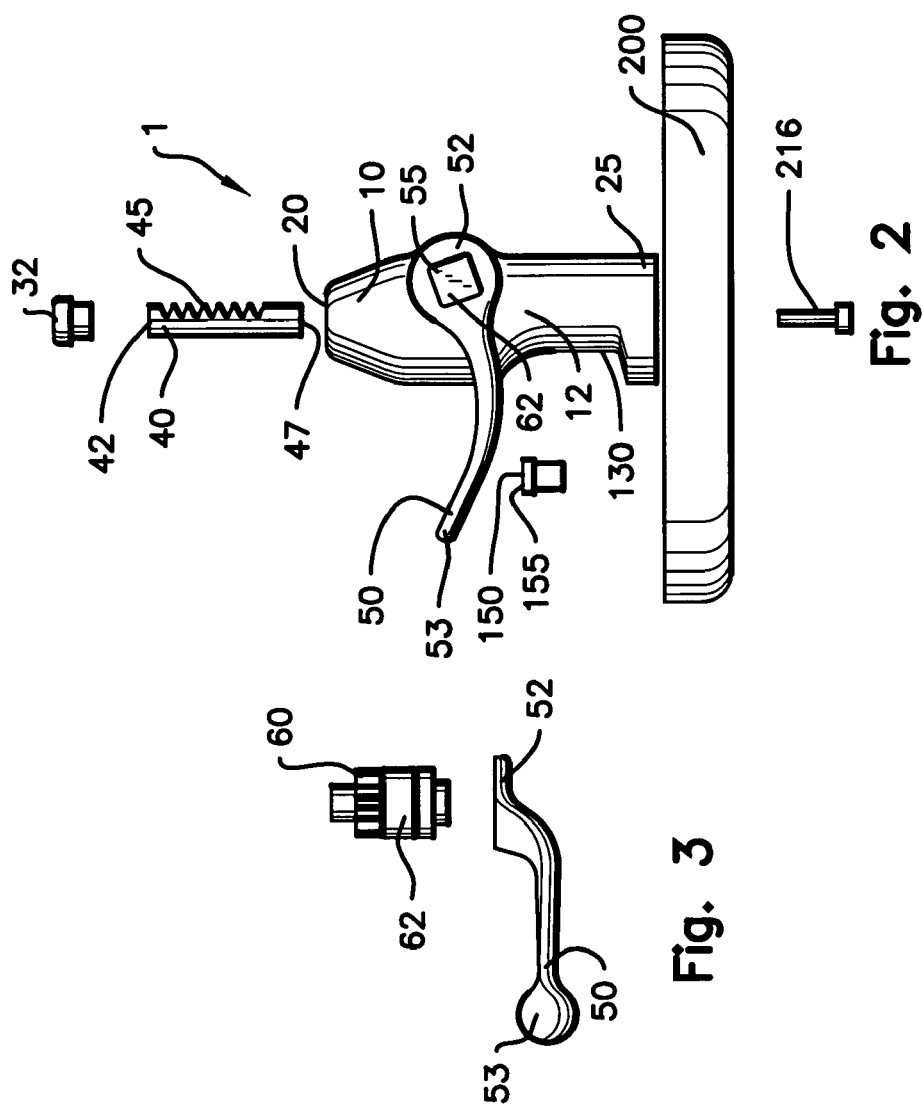

US 7,011,016 B1

NUT CRACKER

FIELD OF THE INVENTION

This invention relates to an apparatus for cracking nuts.

BACKGROUND OF THE INVENTION

Devices for breaking the shells and hulls of nuts and for bearing pressure on objects are widely known in the arts.

The patents referred to herein are provided herewith in an Information Disclosure Statement in accordance with 37 CFR 1.97.

SUMMARY OF THE INVENTION

The Nut Cracker Apparatus (1) disclosed and claimed herein, receives a nut at the top surface of an anvil. A shaft, aligned with the anvil, is moved vertically, by gear and lever means, into contact with the nut thereby exerting cracking or crushing pressure on the shell or hull. The anvil is generally centrally positioned on a floor which is downwardly sloping toward a tray thereby causing the nut meat to be discharged from the anvil and floor into the tray.

BRIEF DESCRIPTION OF THE DRAWINGS

FIG. 1 illustrates a side elevation of the nut cracker (1) showing the housing (10), housing top (20), handle (50) and tray (200).

FIG. 2 is an exploded view of the side elevation showing the nut cracker (1), the housing (10), housing top (20), plunger (40) with plunger rack gear (45), handle (50), anvil (150) with anvil top (155) and tray (200).

FIG. 3 is a top plan view of the handle (50) and handle pinion gear (60).

Figure 6:
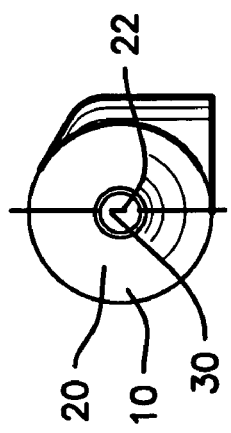
FIG. 6 is a top plan of the housing (10) showing the housing top (20) and housing first aperture (30).
Figure 4:
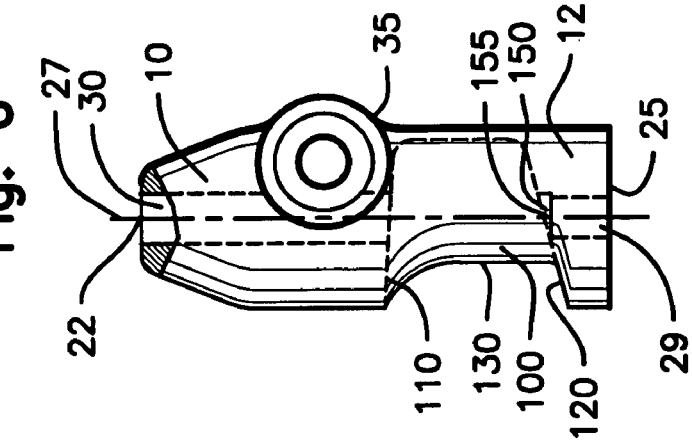
FIG. 4 is a side elevation showing the housing (10), housing top (20), housing first aperture (30) and housing second aperture (35) shown in phantom, chamber (100), chamber top (110), chamber floor (120) and anvil (150) and anvil top (155) shown in phantom.
Figure 7:
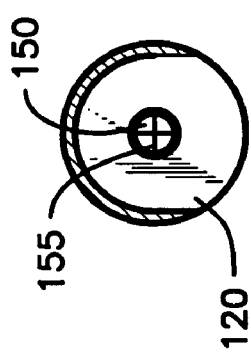
FIG. 7 is "C" section from FIG. 5 illustrating the chamber (100), chamber floor (120), anvil (150) and anvil top (155).
Figure 5:
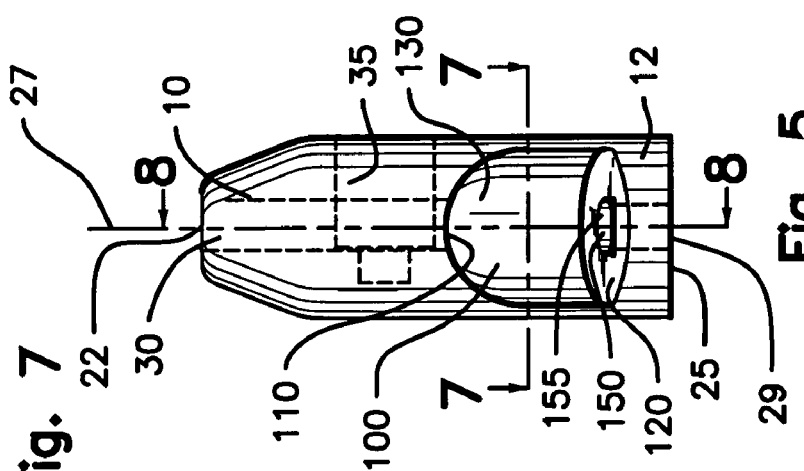
FIG. 5 is a front elevation of the housing (10) showing the housing top (20), housing first aperture (30) and housing second aperture (35) shown in phantom, and chamber (100) with chamber top (110), chamber floor (120) and anvil (150) and anvil top (155).
Figure 8:
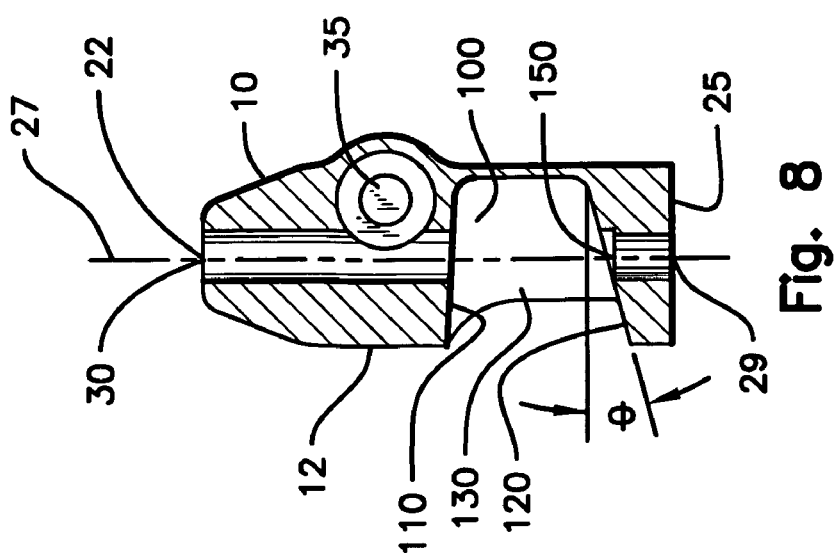
FIG. 8 is a vertical "B" section from FIG. 5 showing the housing (10), housing top (20), housing first aperture (30), housing second aperture (35), chamber (100), chamber top (110), chamber floor (120), anvil (150) and anvil top (155).

The foregoing and other features and advantages of the present invention will become more readily appreciated as the same become better understood by reference to the following detailed description of the preferred embodiment of the invention when taken in conjunction with the accompanying drawings, wherein:

DETAILED DESCRIPTION

FIGS. 1 and 2 show the nut cracker (1) with an upstanding housing (10) having a housing top (20) distal from a tray (200) and a housing bottom (25) affixed to a tray (200). Also seen is the handle (50) with handle gear shaft aperture (55). In the preferred embodiment the handle (50) is elongated to provide leverage to bear cracking pressure on nut shells and hulls. FIG. 2 shows an exploded view of the side elevation showing the nut cracker (1), the housing (10), housing top (20), plunger (40) with plunger rack gear (45), handle (50), anvil (150) with anvil top (155) and tray (200).

FIG. 3 and FIGS. 17, 18 and 19 illustrate a handle (50) and gear shaft (62) with pinion gear (60). The gear shaft (62) is received by friction or press fit into the handle gear shaft aperture (55).

FIGS. 4 through 8 show a housing axis (27) being a concentrically related to a housing first aperture (30) which receives a plunger (40) having gear means. A housing second aperture (35) is orthogonal to and offset from the housing first aperture (30) and receives the pinion gear (60) and gear shaft (62). A concave chamber (100) has a chamber floor (120) which is downwardly sloping toward a chamber opening (130) and the tray (200). The housing first aperture (30) and the housing second aperture (35) are in aperture communication and the pinion gear (60) and plunger (40) gear means are in gear engagement; movement of the handle (50) moves the plunger (40) to contact the anvil top (155).

Figures 9, 10:
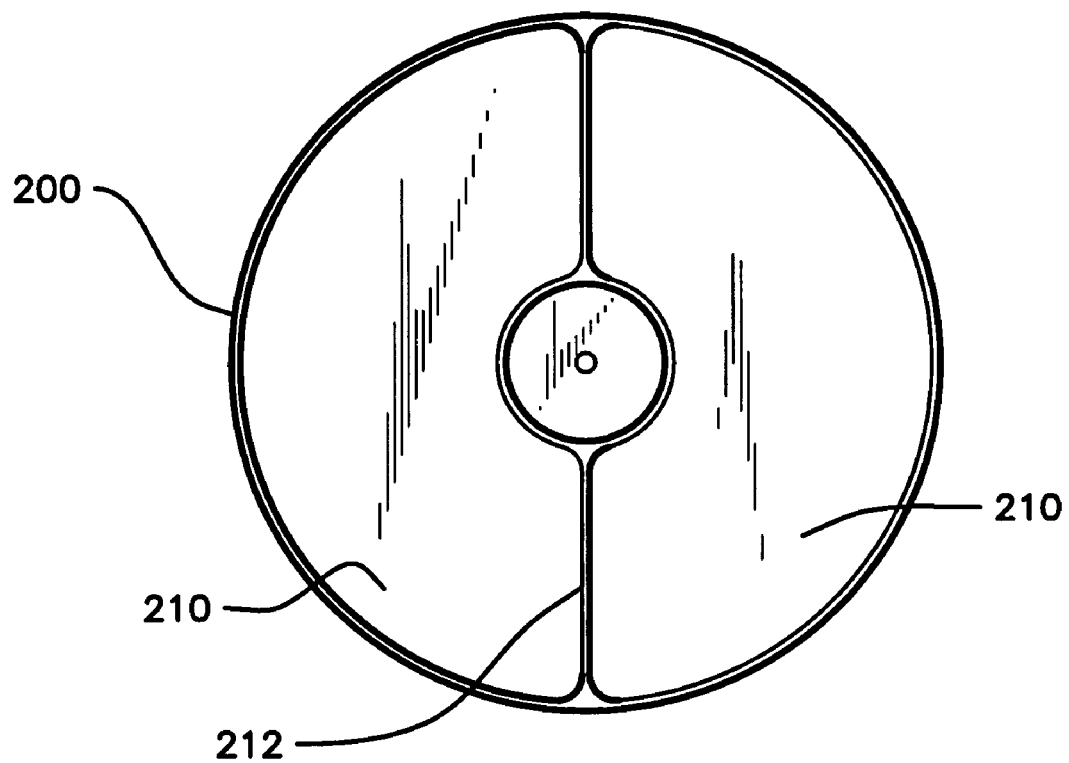
FIG. 9 is a plan view of the tray (200) showing at least one tray compartment (210).
FIG. 10 is an "A" section of the tray (200) from FIG. 9.
Figure 11:
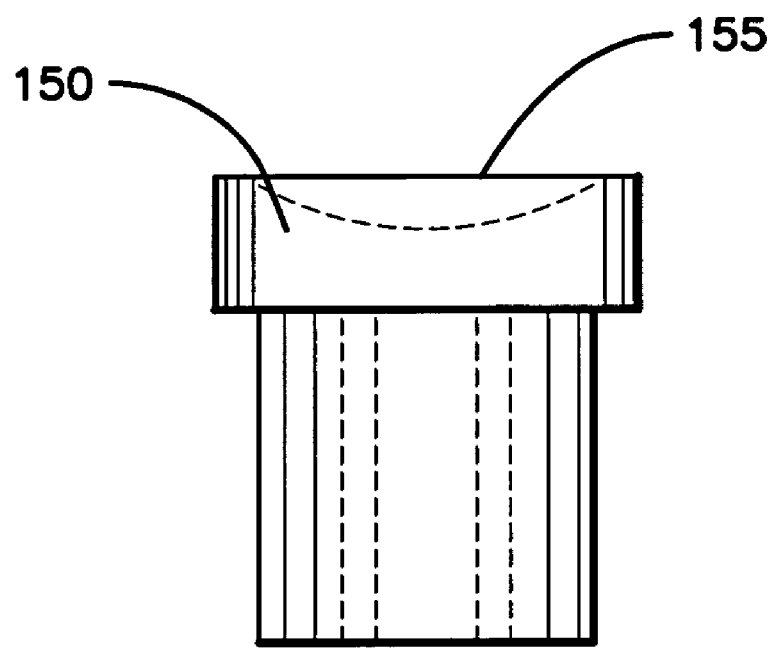
FIG. 11 is an elevation detail of the anvil (150) showing the anvil top (155).
Figure 12:
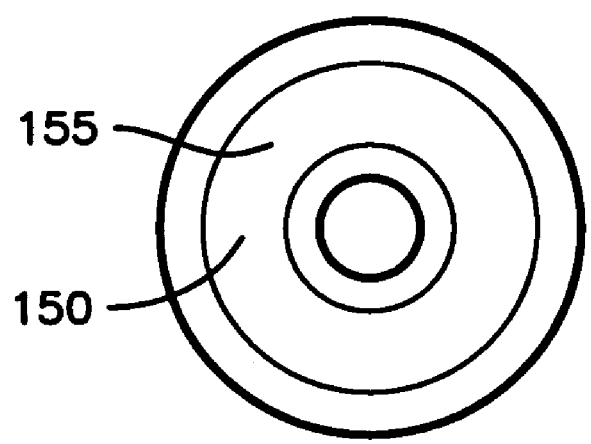
FIG. 12 is a plan detail of the anvil (150) showing the anvil top (155).
Figure 13:
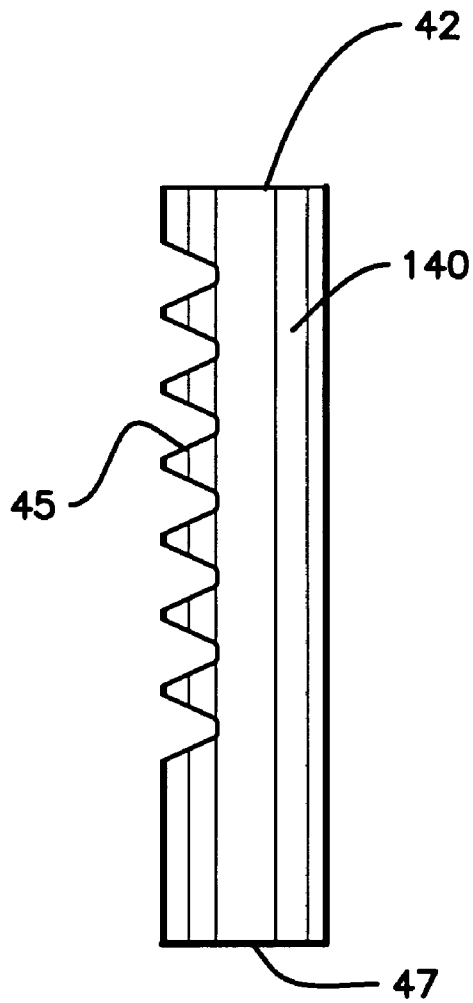
FIG. 13 is a side elevation of the plunger (40), the plunger top (42) and plunger bottom (47) and showing the plunger rack gear (45).
Figure 14:
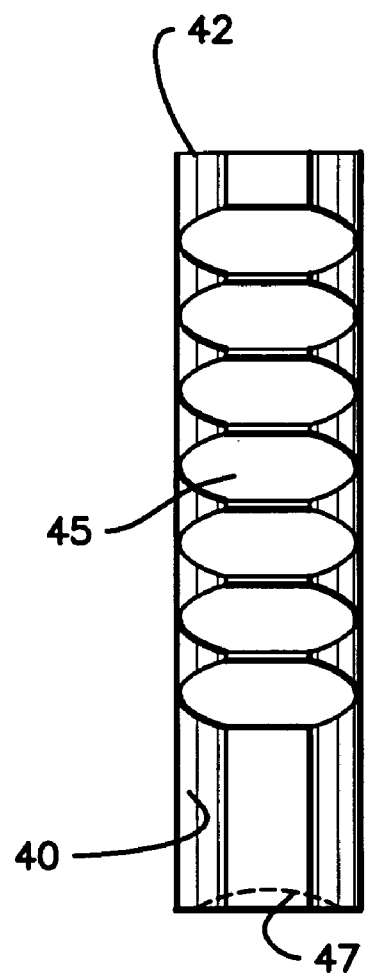
FIG. 14 is a front elevation of the plunger (40) showing the plunger rack gear (45).
Figure 15:
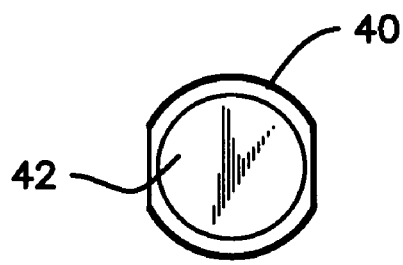
FIG. 15 shows the plunger top (42).
Figure 16:
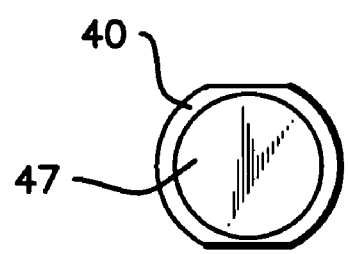
FIG. 16 shows the plunger bottom (47).
Figure 18:
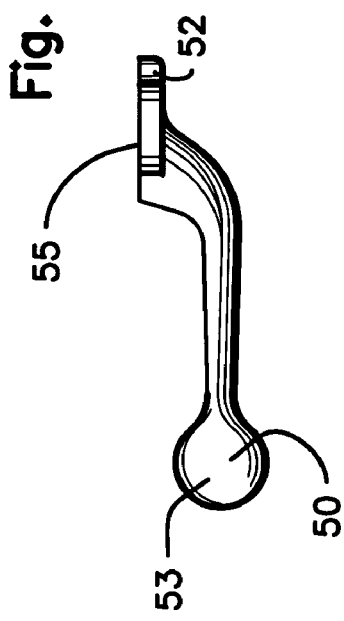
FIG. 18 illustrates a top plan view of the handle (50) and handle gear shaft aperture (55).
Figure 17:
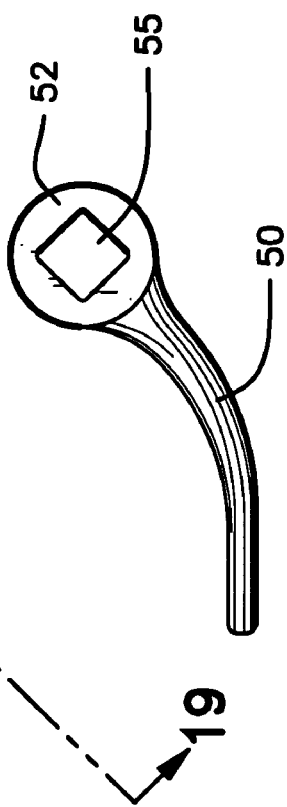
FIG. 17 illustrates a side elevation view of the handle (50) and handle gear shaft aperture (55).
Figure 19:
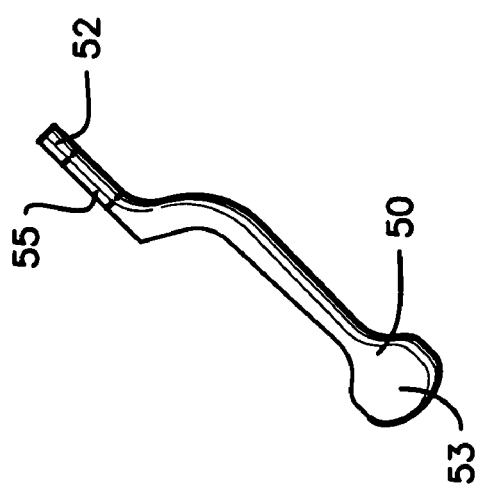
FIG. 19 illustrates a top plan view of the handle (50) and handle gear shaft aperture (55).

FIGS. 9 and 10 illustrate the substantially planar tray (200). The tray will have at least one substantially concave tray compartment (210). In the preferred embodiment the tray (200) will have at least two concave tray compartments (210), one to store nuts to be shelled and one to store meat from shelled nuts, with the at least two tray compartments (210) separated by an upstanding tray divider (212).

The upstanding housing (10) is elongated and upstanding from the planar tray (200). A concave chamber (100) in the housing (10) proximal the tray (200) has a chamber floor (120) which is downwardly sloping to the tray (200). The housing (10) has a first aperture means receiving a plunger (40) having gear means; the plunger (40) is upstanding relative to the tray (200). First aperture means, in the preferred embodiment is a housing first aperture (30) which is concentrically related to a housing axis (27) which extends from the housing top (20) at the housing top center (22) to a housing bottom (25) at a housing bottom center (29). The housing first aperture (30) receives the plunger (40). A handle means having an aperture means receives a gear shaft (62) means. The gear shaft (62) means has affixed thereto gear means (60) affixed by gear affixing means generally including welding, machining or other machine forming process. The housing (10) has a second aperture means which receives the gear means (60) and gear shaft

(62) means. The second aperture means is, in the preferred embodiment, a housing second aperture (35) which is orthogonal to and offset from the housing first aperture (30). The housing second aperture (35) receives the gear means (60) and gear shaft (62) means and is in aperture communication with the housing first aperture (30). The plunger (40) is cylindrical and has rack gear means provided, in the preferred embodiment, by plunger rack gear (45). The gear means (60) and the plunger rack gear (45) are in gear engagement. The plunger (40) has a plunger bottom (47). An anvil (150) is affixed by anvil affixing means at the chamber floor (120). Anvil affixing means includes welding, press and threaded means. The anvil (150) has an anvil top (155) which is aligned with the plunger (40) and plunger bottom (47). The gear means (60), which is in gear engagement with the plunger (40) gear means is moved by the handle (50). Rotating or pivoting movement of the handle, around the housing second aperture (35) causes gear engagement of the plunger rack gear (45) and the handle pinion gear (60) causing plunger (40) to move relative to and in contact with the anvil top (155). The anvil top (155) is concave and receives a nut.

The components of this invention including the housing (10), the planar tray (200), the plunger (40), the handle means, gear shaft (62) and gear means (60), the plunger rack gear (45), the anvil (150) and anvil top (155) and plunger bottom (47) are formed from rigid materials including primarily metals and plastics.

I claim:

1. A Nut Cracker Apparatus (1) comprising:
  a. a upstanding elongated housing (10) having a housing top (20), a housing bottom (25) and a housing interior; the housing top (20) having a housing top center (22) and the housing bottom (25) having a housing bottom center (29); the housing (10) at the housing bottom (25) immovably affixed by affixing means to a tray (200); the housing (10) generally orthogonal relative to the tray (200); the tray (200) is generally planar forming a tray plane (210); a housing axis (27) from the housing top center (22) to the housing bottom center (29) is generally orthogonal to the tray plane (210);
  b. the housing (10) having a concave chamber (100) therein formed intermediate the housing top (20) and the housing bottom (25); the chamber having a chamber top (110) distal from the housing bottom (25) and a generally planar chamber floor (120) proximal the housing bottom (25); the chamber (100) having a chamber opening (130) proximal the housing bottom (25) and in nut meat discharge communication with the tray (200);
  c. a housing first aperture (30) concentrically located with the housing axis (27) from the housing top center (22) to the chamber top (110); the housing first aperture (30) receiving a elongated cylindrical plunger (40) with plunger rack gear (45); the plunger (40) having a plunger top (42) proximal the housing top (20) and a plunger bottom (47) distal to the plunger top (42); the plunger bottom (47) is concave;
  d. a housing second aperture (35) generally orthogonal to the housing first aperture (30); the housing second aperture (35) offset from the housing axis (27);
  e. a handle (50) has a handle first end (52) and a handle second end (53) distal from the handle first end (52); a handle gear shaft aperture (55) proximal the handle first end (52) which receives by affixing means a pinion gear shaft (62); a pinion gear (60) distal from the handle gear shaft aperture (55); the housing second aperture (35) receiving the pinion gear (60) and pinion gear shaft (62);
  f. the housing first aperture (30) and the housing second aperture (35) intersect to allow gear engagement between the plunger rack gear (45) and the pinion gear (60) so that downward movement of the handle (50) moves the plunger (40) downward and that upward movement of the handle (50) moves the plunger (40) upward;
  g. an anvil (150) concentrically aligned with the housing axis (27); the anvil (150) having a concave anvil top (155); the concave plunger bottom (47) is proximal to or contacts the anvil top (155) when the plunger (40) is moved most downwardly most proximal to the housing bottom (25); the anvil top (155) receives a nut;
  h. the chamber floor (120) forms an acute angle relative to the housing axis (27), the housing bottom (25) and the tray (200); the chamber floor (120) slopes downwardly toward the tray (200) at the chamber opening (130);
  i. the housing (10), the planar tray (200), the plunger (40), the handle means, gear shaft (62) and gear means (60), the plunger rack gear (45), the anvil (150) and anvil top (155) and plunger bottom (47) are formed from rigid materials including metals and plastics.

2. A Nut Cracker Apparatus (1) comprising:
  a. an upstanding housing (10); the housing (10) upstanding from a planar tray (200); a concave chamber (100) in the housing (10) proximal the tray (200); the chamber (100) having a chamber floor (120) downwardly sloping to the tray (200);
  b. the housing (10) having a first aperture means receiving a plunger (40) having plunger gear means (45); the plunger (40) upstanding relative to the tray (200);
  c. handle means having aperture means receiving a gear shaft (62) means; gear means (60) affixed by gear affixing means to the gear shaft (62) means; the housing (10) having a second aperture means (35) receiving the gear means (60) and gear shaft (62) means;
  d. the plunger (40) having a plunger bottom (47); an anvil (150) affixed by anvil affixing means at the chamber floor (120); the anvil (150) having an anvil top (155); the anvil (150) and anvil top (155) aligned with the plunger (40) and plunger bottom (47);
  e. the gear means (60) in gear engagement with the plunger (40) gear means; movement of the handle causing the plunger (40) to move relative to and in contact with the anvil top (155); the anvil top (155) receiving a nut.

3. The Nut Cracker Apparatus (1) of claim 2 further comprising:
  a. the upstanding housing (10) is elongated having a housing top (20) and a housing top center (22); the planar tray (200) has at least one substantially concave tray compartment (210);
  b. the plunger gear means (45) is a plunger rack gear (45);
  c. the handle (50) is elongated; the gear means (60) is a handle pinion gear (60); gear affixing means includes welding, machining and other machine forming processes;
  d. a housing axis (27) from the housing top center (22) to a housing bottom center (29) at a housing bottom (25), is upstanding from and generally orthogonal to the tray plane (210); the first aperture means (30) is orthogonal to and offset from the second aperture means (35);

d. anvil affixing means includes welding, press and threaded means; rotating or pivoting movement of the handle, relative to the housing second aperture (35) causes gear engagement of the plunger rack gear (45) and the handle pinion gear (60) causing the plunger (40) to move relative to and in contact with the anvil top (155).

4. The Nut Cracker Apparatus (1) of claim 3 further comprising:
  a. the tray (200) has at least two concave tray compartments (210) separated by an upstanding tray divider (212);
  b. the housing (10), the planar tray (200), the plunger (40), the handle means, gear shaft (62) and gear means (60), the plunger rack gear (45), the anvil (150) and anvil top (155) and plunger bottom (47) are formed from rigid materials including metals and plastics;
  c. the housing first aperture means (30) is a first aperture (30), formed by drilling, or plastic forming techniques, from the housing top center (22) to a chamber top (110) distal from the housing bottom (25);

and a generally planar chamber floor (120) proximal the housing bottom (25); the chamber (100) having a chamber opening (130) proximal the housing bottom (25) and in nut meat discharge communication with the tray (200); the first aperture means (30) is concentric with the housing axis (27); the housing second aperture means (35) is a housing second aperture (35), formed by drilling or plastic forming techniques intermediate the housing top (20) and housing bottom (25) generally orthogonal to and offset from the housing first aperture (30);
  d. the downwardly sloping chamber floor (120) forms an acute angle relative to the tray (200) proximal the chamber opening (130;
  e. the plunger bottom (47) is concave; the anvil top (155) is concave.

* * * * *